(12) United States Patent
Sundquist et al.

(10) Patent No.: US 10,953,453 B2
(45) Date of Patent: Mar. 23, 2021

(54) MAGNETIC PRESS BRAKE TOOLING ENGAGEMENT SYSTEM

(71) Applicant: Mate Precision Tooling, Inc., Anoka, MN (US)

(72) Inventors: Dean A. Sundquist, Anoka, MN (US); Bruce Thielges, Anoka, MN (US); Ron Windingstad, Anoka, MN (US)

(73) Assignee: Mate Precision Technologies Inc., Anoka, MN (US)

( * ) Notice: Subject to any disclaimer, the term of this patent is extended or adjusted under 35 U.S.C. 154(b) by 160 days.

(21) Appl. No.: 15/805,072

(22) Filed: Nov. 6, 2017

(65) Prior Publication Data
US 2019/0134691 A1 May 9, 2019

(51) Int. Cl.
| | | |
|---|---|---|
| *B21D 5/02* | (2006.01) | |
| *B21D 37/14* | (2006.01) | |
| *B23Q 3/155* | (2006.01) | |
| *B21D 55/00* | (2006.01) | |

(52) U.S. Cl.
CPC .......... *B21D 37/14* (2013.01); *B21D 5/0236* (2013.01); *B23Q 3/15566* (2013.01); *B21D 5/0218* (2013.01); *B21D 5/0227* (2013.01); *B21D 55/00* (2013.01)

(58) Field of Classification Search
CPC ........ B21D 5/0236; B21D 5/02; B21D 37/14; B21D 5/0209; B21D 5/0218; B21D 5/0227; B21D 5/0254; B21D 37/02; B23Q 3/15566
See application file for complete search history.

(56) References Cited

U.S. PATENT DOCUMENTS

| | | |
|---|---|---|
| 2,912,249 A | 11/1959 | Eckhold |
| 3,377,887 A | 4/1968 | Nelson et al. |
| 3,907,452 A | 9/1975 | Tripp |
| (Continued) | | |

FOREIGN PATENT DOCUMENTS

| | | |
|---|---|---|
| AT | 515526 T | 10/2015 |
| EP | 0387121 A1 | 9/1990 |
| (Continued) | | |

OTHER PUBLICATIONS

Notification of Transmittal of the International Search Report and the Written Opinion of the International Searching Authority, or the Declaration (PCT/US2018/039931) dated Nov. 7, 2018 (14 pages).

(Continued)

*Primary Examiner* — Debra M Sullivan
(74) *Attorney, Agent, or Firm* — Dorsey & Whitney LLP

(57) ABSTRACT

A punch or die component for a press brake apparatus includes a tool body having a coupling end adapted for coupling with a holder, and a working end adapted for operation on a workpiece. One or more magnetic elements can be adapted for selective engagement of the punch or die component within a press apparatus by magnetic coupling with the tool body, where the working end is configured for forming the workpiece by operation of the press apparatus. The magnetic coupling can be defined between the tool body and holder disposed adjacent the coupling end, or between the tool body and an adjacent punch or die component disposed along a side surface of the tool body, or both.

20 Claims, 14 Drawing Sheets

(56) References Cited

U.S. PATENT DOCUMENTS

| | | | |
|---|---|---|---|
| 4,197,772 | A | 4/1980 | Anderson et al. |
| 4,787,237 | A | 11/1988 | Houston et al. |
| 5,595,560 | A | 1/1997 | Kamada |
| 5,782,308 | A | 7/1998 | Latten et al. |
| 5,794,486 | A | 8/1998 | Sugimoto et al. |
| 6,003,360 | A | 12/1999 | Runk et al. |
| 6,557,390 | B2 | 5/2003 | Runk et al. |
| 6,848,291 | B1 | 2/2005 | Johnson et al. |
| 6,928,852 | B2 | 8/2005 | Enderink |
| 2006/0174680 | A1 | 8/2006 | Shimota et al. |
| 2011/0247389 | A1 | 10/2011 | Rouweler et al. |
| 2013/0019650 | A1 | 1/2013 | Rogers et al. |
| 2015/0143867 | A1 | 5/2015 | Sato et al. |
| 2017/0066032 | A1 | 3/2017 | Jarrier |
| 2017/0144206 | A1 | 4/2017 | Felder |
| 2017/0232493 | A1 | 8/2017 | Denkmeier et al. |
| 2017/0297073 | A1 | 10/2017 | Sato |
| 2018/0071805 | A1 | 3/2018 | Sundquist et al. |
| 2018/0304331 | A1* | 10/2018 | Cavicchia ............ B21D 5/0254 |
| 2019/0001387 | A1 | 1/2019 | Sundquist et al. |

FOREIGN PATENT DOCUMENTS

| | | |
|---|---|---|
| EP | 1321200 A2 | 6/2003 |
| EP | 1479461 A1 | 5/2004 |
| EP | 1 321 200 B1 | 3/2008 |
| FR | 2791590 A1 | 3/1999 |
| FR | 2791590 A1 | 10/2000 |
| WO | 2016023057 A1 | 2/2016 |
| WO | 2017067879 A1 | 4/2017 |
| WO | WO2018049056 A1 | 3/2018 |

OTHER PUBLICATIONS

International Search Report and Written Opinion of the International Searching Authority for International Patent Application No. PCT/US2017/050524, dated Dec. 1, 2017 (14 pages).
Notification of Transmittal of the International Search Report and the Written Opinion of the International Searching Authority, or the Declaration (PCT/US2018/059407) dated Jan. 15, 2019 (10 pages).
Written Opinion of the International Preliminary Examining Authority for International Patent Application No. PCT/US2018/039931, dated Jul. 12, 2019 (6 pages).
"Ferromagnetism" obtained from Hyperphysics website (Georgia State University), 4 pages.

* cited by examiner

MAGNETIC PRESS BRAKE TOOLING ENGAGEMENT SYSTEM

FIELD

This application is directed to magnetic engagement systems for press brake tooling, and related machine tool and die systems. Applications include, but are not limited to, magnetic coupling mechanisms adapted for engaging press brake punch and die components with a press brake apparatus, e.g., as adapted for sheet metal fabrication, or other machine tool and die application.

BACKGROUND

A typical machine press system includes a press apparatus with an upper table or ram arranged to move vertically with respect to a lower table or other (e.g., stationary) fixture. Various forming tools may be mounted to the tables to bend or impress a workpiece such as a piece of sheet metal, when the tables are brought together. Generally, the upper table can be configured for coupling with a (male) punch or press brake tool component adapted for sheet metal fabrication or other manufacturing process, in cooperation with a complementary (female) forming tool such as a die, which is coupled with the lower table. In order to perform a variety of forming operations, differently shaped forming tools are frequently interchanged and assembled in different combinations, depending on the workpiece material, and desired final configuration.

Multiple forming tools can be inserted side-by-side in the upper and lower tables, in order to provide a unitary forming surface having a total length equal to the summed lengths of each respective tool. Occasionally, it is desirable to create a forming surface length configured to accommodate a workpiece that has already been partially formed (e.g., bent) into one or more flanges. In such situations, it may be desirable to assemble a forming surface with a total length that is less than a length of the partially-formed workpiece to avoid flattening the already-formed flanges. Thus, recombining forming tools of variable shape and/or length may be necessary mid-operation, on a single workpiece.

The forming dies included in the lower table are generally held in place by a lower die holder, which often includes set screws extending through the front wall of the holder. To secure the dies within the die holder, the set screws may tighten directly against a surface of the each die. In this method of securing the dies, the set screws typically tighten against the dies at fixed intervals. As a result, narrower dies must be aligned with the set screws, to ensure they will be secured. Dies not so aligned may become loose and dislocate, or even tip over. Even when a narrower die can be aligned with one or more set screws, its position must still be maintained until the set screws are tightened. As a result, there is a continuing need for improved press brake punch and die engagement systems, which do not suffer from all the limitations of the prior art.

SUMMARY

In accordance with the various examples and embodiments of the disclosure, a tooling component such as a forming die or punch tool is provided with one or more magnetic elements adapted for selectively engaging the die or tool component within a press brake apparatus, e.g., via a magnetic coupling with the punch tool or die body. The magnetic elements may be adapted for engagement with an adjacent punch or die component, or with the holder, or another component of the press brake apparatus. An actuator can be configured to selectively disengage the magnetic coupling, e.g., by urging the coupling end of the punch or die from the holder, or other adjacent press brake component.

DETAILED DESCRIPTION

Figure 1:
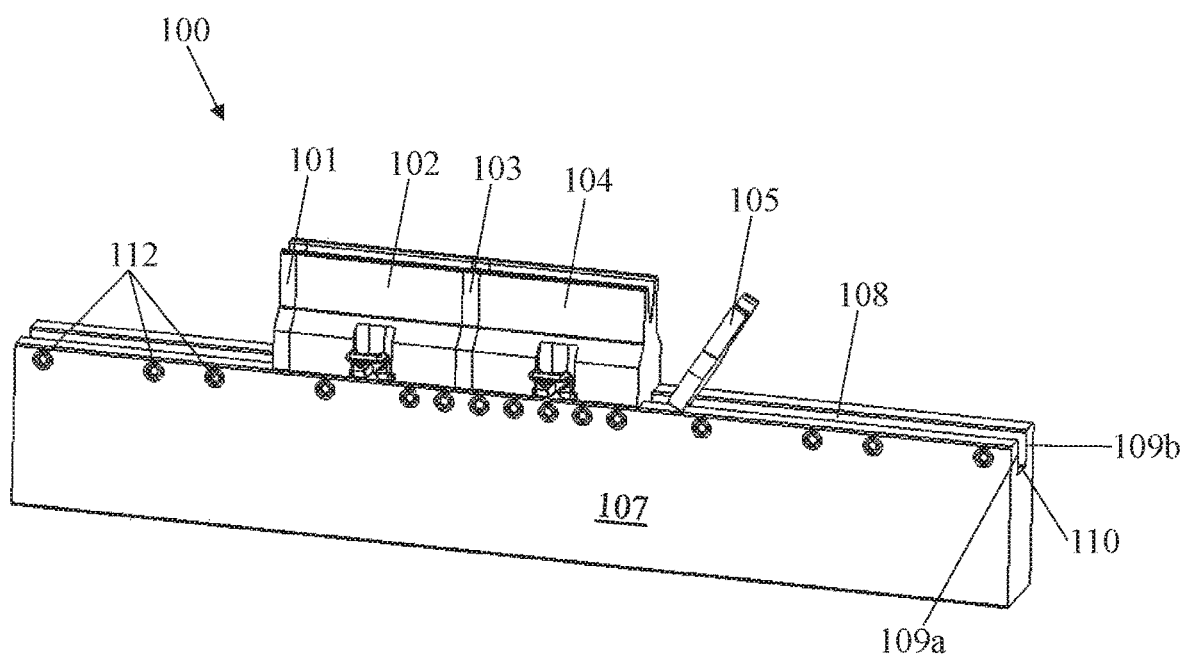
FIG. 1 is an isometric view of a press brake apparatus with multiple dies mounted on a die holder, and adapted for magnetic engagement.

FIG. 1 is an isometric view of a press brake apparatus 100 with machine tool components including five dies 101-105 engaged within a die holder 107. A longitudinally extending mounting slot 108 configured to receive the coupling ends of each die is defined by two vertical mounting surfaces 109a, 109b and a horizontal, bottom mounting surface 110. A plurality of set screws 112 is included within die holder 107, positioned at fixed intervals along the length of the holder body to secure the dies thereto.

As shown in FIG. 1, dies 101, 103 and 105 are similarly narrow. While dies 101 and 103 are securely mounted within mounting slot 108, die 105 is in the process of tipping over.

The instability of die 105 is a consequence of its position between adjacent set screws 112. In particular, die 105 is too narrow to overlap with any set screws at the position shown, making it more susceptible to tipping and sliding, especially during assembly of the press brake apparatus.

Dies 101 and 103, by contrast, are securely coupled with die holder 107 despite being similarly misaligned with the set screws 112. This disparity in coupling stability results from positioning dies 101 and 103 directly adjacent to neighboring dies 102 and 104, which may each include a magnetic coupling mechanism configured to couple dies 102, 104 with adjacent dies 101 and 103, as well as holder 107. The stability of dies 102 and 104, and thus 101 and 103, may be further strengthened by the larger size of dies 102 and 104, which provides a more stable base less likely to tip, and the overlap of the dies with multiple set screws 112. Components that may be included in the magnetic coupling mechanism of a die are shown in FIG. 2, with reference to an exemplary machine tool punch or die component 200.

Figure 2:
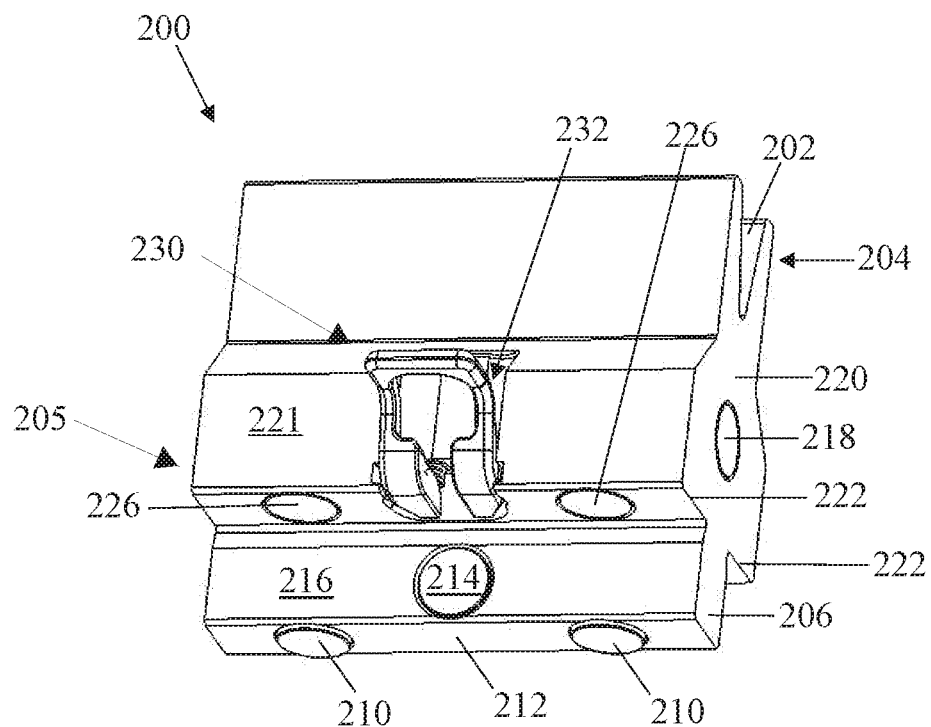
FIG. 2 is a dimetric view of a die configured for magnetic engagement with a die holder and mating dies in a representative press brake apparatus.

FIG. 2 is a dimetric view of such a punch or die component 200, configured for magnetic engagement with one or both of an adjacent die and the die holder, such as die holder 107 shown in FIG. 1. The die 200 includes a concave forming surface 202 defined by a working end 204 positioned generally opposite a coupling end 205, which can be defined by a spud or tang 206. The tang 206 is configured for insertion within a complementary cavity defined by a die holder, such as mounting slot 108. Two vertically disposed tang magnets 210 are visible at a bottom surface 212 of tang 206, and one horizontally disposed tang magnet 214 is visible at a front surface 216 of the tang. Within the body of the die 200, a horizontally disposed magnet 218, oriented transversely to tang magnet 214, is visible at side surface 220. The die 200 further defines two opposing shoulders 222, which may abut complementary load-bearing surfaces of a die holder upon coupling the die with the holder. Within the first shoulder 222, two vertically disposed shoulder magnets 226 are visible. An actuator or similar disengagement mechanism 230 can be configured for decoupling the die 200 from its holder, e.g., using a lever-type mechanism 230 installed within a cavity 232 defined by the first shoulder 222. The configuration of the mechanism 230 may vary, for example to provide for manual operation or similar tool-less user manipulation to disengage the magnetic coupling between the tool or die body 221 and the holder, in order to remove component 200.

Together, the vertically disposed tang magnets 210, horizontally disposed tang magnet 214, and vertically disposed shoulder magnets 226 comprise at least a portion of a magnetic coupling mechanism configured to reversibly couple die 200 with a die holder. More particularly, the magnets can form a magnetic assembly configured to generate a magnetic flux coupling between die 200 and the holder. Each magnet shown in FIG. 2 may create a coupling effect with one or more distinct surfaces of the die holder, which may depend on the specific position and orientation of each magnet. Overall, an individual magnet or suitable combination of magnets can produce the desired magnetic coupling mechanism induced by the magnetic elements of die 200 and a die holder, e.g., holder 107, and may be used to couple the die with the holder while arranging or staging additional dies within the holder and/or other holders. In some embodiments, the coupling mechanism may provide a safety mechanism for temporarily coupling die 200 with holder 107, for example before an additional clamping mechanism, e.g., tightening via set screws, is activated and the press brake apparatus begins operating to form a workpiece. In some examples, the magnetic coupling mechanism may suffice to secure die 200 with holder 107 without additional support.

By exposing an end portion of one or more magnets at a surface of the die, the magnets can directly contact complementary mating surfaces of the die holder, thereby restricting lateral sliding of the die 200 within the holder by creating a frictional sliding effect. Positioning the magnets flush with the surface of die 200 can also utilize the maximum pulling force of each magnet, further increasing the sliding force of friction between the die and a holder. A reduction in lateral sliding may facilitate the assembly of multiple dies within a die holder.

In some examples, tang magnet 214 may span the width of tang 206, such that both ends of the tang magnet can create a magnetic coupling effect with the vertical mounting surfaces 109a, 109b defined by the mounting slot 108, especially if the tang fits precisely within the mounting slot. The magnetic coupling effect generated between tang magnet 214 and vertical mounting surfaces 109a, 109b of mounting slot 108 can orient and position tang 206 in the vertical direction, creating a frictional sliding effect when die 200 is removed vertically from holder 107. The number of horizontally disposed tang magnets can vary, ranging from one to about three, five, seven, ten or twelve magnets, or more, depending on the tool or die length, width and weight, and the desired coupling strength.

Vertically disposed tang magnets 210 can create a magnetic coupling effect with a bottom surface of a die holder mounting slot, e.g., bottom surface 110 of mounting slot 108. As shown, tang magnets 210 may protrude from bottom surface 212 to bridge the gap between the bottom surface of the mounting slot and the bottom surface of the tang. In some embodiments, an air gap may exist between bottom surface 212 and bottom surface 110 of mounting slot 108. Minimizing the size of this air gap may be preferred in some examples to strengthen the magnetic coupling effect between tang magnets 210 and the die holder. Accordingly, the position of tang magnets 210 relative to bottom surface 212 of tang 206 may vary in different embodiments. The number of vertically disposed tang magnets may also vary, ranging from one to about three, five, seven, ten, twelve or more magnets, depending on tool length, width and mass.

Vertically disposed shoulder magnets 226 can create a magnetic coupling effect between shoulder 222 and a complementary load-bearing surface defined by die holder 107. As shown, shoulder magnets 226 can also be exposed at one end for direct contact with the mating surface of a die holder. The magnetic coupling effect created between shoulder 222 and the complementary mating surface of the die holder may be distinct from the magnetic coupling effect created between the tang magnets and the mounting slot. In some examples, the magnets in the tang and the shoulder of the die may contribute to the same magnetic coupling effect, e.g., by inducing a unitary magnetic circuit involving the tang and the shoulder portions of the die, along with a portion of the die holder. In some examples, one or more additional, vertically disposed shoulder magnets can be included within shoulder 222, thus generating a magnetic coupling effect with the load-bearing surfaces on both sides of mounting slot 108. The number of vertically disposed shoulder magnets disposed within each shoulder portion defined by the die may also vary, ranging from one to about three, five, seven, ten, twelve or more magnets, depending on the tool or die length, width and mass.

Magnet 218 can comprise at least a portion of a magnetic coupling mechanism configured to reversibly couple die 200 with an adjacent die, such as die 101 or 103 shown in FIG. 1. In some examples, such a side magnet 218 is needed in only one of two adjacent dies to create a magnetic coupling effect between the dies that is sufficient to secure the die lacking a magnet against side surface 220. The lateral coupling effect created between adjacent dies via magnet 218 can prevent or at least reduce the likelihood of a magnetically coupled die from tipping or sliding. This may be particularly important for stabilizing narrow dies, e.g., dies 101 and 103, which may not align with set screws in the die holder and may lack a stable base. Magnet 218 can act in conjunction with one or more additional magnets included in die 200. In some examples, more than one magnet 218 is included in the side surface 220 of the die or other tool component 200, for example between two and about three, five, seven or ten side magnets, or up to twelve magnets or more.

In some examples, the magnetic assembly used to create the magnetic coupling effect between adjacent dies and/or between a die and a die holder may include one or more ferromagnetic components. Ferromagnetic components can be arranged within the die to increase the strength of the magnetic coupling and guide the induced magnetic flux between the die and its holder or neighboring die. In some examples, the magnetic elements comprising a magnetic assembly may include one or more ferromagnetic flux guides configured to guide a magnetic flux between a die and its corresponding die holder and/or adjacent die. In addition, the die holder may comprise a ferromagnetic material, such as carbon steel or medium alloy (magnetic) steel. The number and/or arrangement of magnets and/or ferromagnetic components included in each die may vary. For example, vertically disposed magnets may be exchanged for horizontally disposed magnets and vice versa. The number of magnets included within each die may range from 1 to about 50, depending on the desired strength of the magnetic coupling mechanism and/or the configuration, e.g., weight and/or shape, of the die and its corresponding holder. In some embodiments, the magnets can be fixed, e.g., press-fit or glued, within the die, such that the magnets are not switchable or adjustable. In some embodiments, the magnetic elements of the die can be configured as cylindrical island assemblies contained within non-ferromagnetic isolating tubes. In addition or alternatively, the magnetic elements can be installed directly into the body of the die. If space is limited, one or more magnetic strips can also be used, e.g., attached to a die surface, to supplement or replace the magnets embedded within the die.

In some examples, one or more magnets can be removable or adjustable. Removable magnets can be slidable within loose-fitted holes defined by the die. Such magnets can be secured within the loose-fitted holes using one or more set screws or other coupling members, for example. Selectively manipulating adjustable magnets, for instance by physically moving the magnets directly or via an actuator, can modulate the strength of the magnetic coupling mechanism. For example, moving a magnet further within the body of die 200 may reduce the pull force generated by the magnet by creating an air gap between the die and its holder. This may be necessary when the force generated by a magnet is excessive for a particular application. Modulating the strength of the magnetic coupling mechanism can be implemented to switch the die between engaged (locked), disengaged (unlocked) and/or intermediate configurations with respect to a die holder. In some examples, one or more magnets may be vertically slidable to adapt to variations in the amount of clearance between mating surfaces of a die and its holder. Clearance differences may result from variation in tang dimensions, e.g., clearance may be greater between a relatively short tang and bottom mounting surface 110 of die holder 107. Adjustable tang magnets may thus accommodate differently-sized tangs by protruding variable distances from bottom surface 212 of tang 206.

More generally, suitable machine tool components can be provided in the form of a press brake tool, punch or die 200, with a body (or body portion) 221 having a coupling end 205 adapted for selective engagement with a holder and a working end 204 adapted for operation on a workpiece. Depending on embodiment, the working end 204 of the tool or die body 221 may define a die with a concave working surface 202 adapted for forming the workpiece, e.g., by engagement of the workpiece between the die end 204 and a tool operated by the press brake apparatus.

One or more magnetic elements 210, 214, 218, 226 can adapted for magnetic engagement with the tooling component 200, e.g., by a magnetic flux coupling with the tool or die body 221, e.g., either with an adjacent tooling component 200 or with the holder (or other component of the press brake assembly), where the working 204 end defines a punch or die surface configured for forming the workpiece by operation of the press brake apparatus.

The magnetic elements 210, 214, 218, 226 may comprise magnets disposed in the body 221 of the tooling component 200, and adapted to generate magnetic flux to induce the magnetic flux coupling. The magnetic elements 210, 214, 218, 226 may also comprise ferromagnetic elements or flux guides disposed in the body 221, and adapted to guide magnetic flux to induce the magnetic flux coupling.

As shown in FIG. 2, one or more magnetic elements 218 are adapted to induce the magnetic flux coupling with an adjacent tooling component 200, e.g., disposed along a lateral side (or side surface) 220 of the tool or die body 221. The adjacent tooling component 200 will also typically have a respective working end 204 configured for forming the workpiece, in cooperation with the tooling component 200 magnetically engaged along the lateral side 220. The strength of the magnetic flux coupling can be adapted for insertion of the adjacent tooling components 200 into the holder together as a unit, in the adjacent relationship via the magnetic flux coupling along the respective lateral sides 220.

A tang 206 can be defined on the coupling end 205 of the body 221, and adapted for engagement with one or more set screws disposed along the holder. The adjacent tooling component can also be coupled to the holder with a set screw, or disposed in the holder at location absent such a set screw. The strength of the magnetic flux coupling is selected to maintain the adjacent tooling component upright in the holder, upon operation of the press apparatus to form the workpiece.

The magnetic elements 210, 214, 226 can also comprise one or more magnets disposed in the body 221 of the tooling component 200 to induce the magnetic flux coupling between the coupling end 205 and the holder. For example, a tang 206 may be defined on the coupling end 205 of the tool body 205, e.g., with one or more magnets 210, 214 disposed in the tang 206 and adapted for selective engagement of the tool component 200 by magnetic flux coupling between the tang 206 on the coupling end 205 of the body 221 and the tool holder. Suitable tang arrangements include one or more magnets 210 disposed in a vertical orientation to induce the magnetic flux coupling along the bottom surface 212 of the tang 206, and one or more magnets 214 disposed in a horizontal orientation to induce the magnetic flux coupling along one or more side surfaces 216 of the tang 206.

A load-bearing shoulder or similar surface 222, can also be defined on the tool or die body 221, and adapted to bear a mechanical load between the holder and the tooling component 200 upon operation of the press brake apparatus to engage the working end 204 with a workpiece. Suitable shoulder arrangements include one or more magnets 226 disposed in or along the load-bearing shoulder surfaces 222, and adapted to induce the magnetic flux coupling between the holder and the tooling component 200 along one or both of the shoulder surfaces 222.

Figure 3:
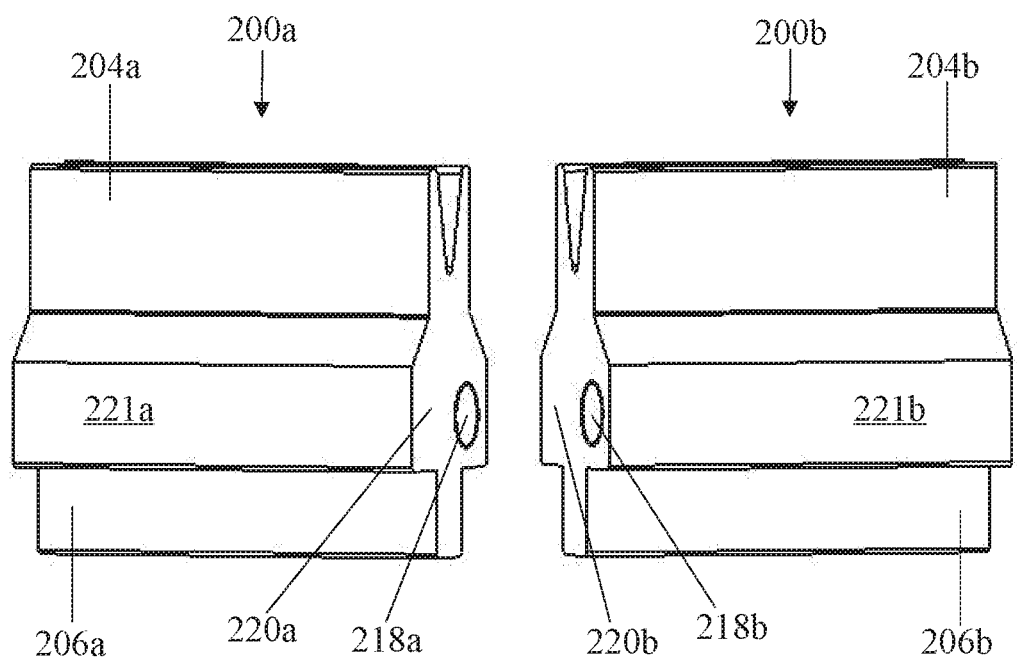
FIG. 3 is an isometric view of two dies arranged side-by-side, showing an offset arrangement of the magnets included respectively within the lateral sides of each die.

FIG. 3 is an isometric view of two tooling components 200a, 200b, e.g., in the configuration of press tools or forming dies, as defined by the geometry of the respective working ends 204a, 204b. Machine tool components 200a, 200b are arranged side-by-side and in an adjacent relationship for engagement with a holder, e.g., by tangs 206a, 206b (or other suitable coupling features). Alternatively, one or both of the punch or die components 200a, 200b can be provided in a flat-bottomed configuration (e.g., as shown in FIG. 10), without a corresponding tang 206a, 206b, or slots can be formed in the bottom of the tool components 200a, 200b, and adapted for engagement with a complementary tang structure on the tool holder.

FIG. 3 shows an offset or staggered arrangement of magnets 218a and 218b included respectively within or along the respective lateral side surfaces 220a, 220b of each die or tool component 200a, 200b. When components 200a and 200b are pushed together prior to or during assembly with a holder, the magnets 218a and 218b may be offset along the respective lateral sides 220a 220b, so they do not directly align or overlap when the tool bodies 221a, 221b are magnetically coupled or engaged along the adjacent sides 220a, 220b. Accordingly, the magnetic fields of magnets 218a, 218b may be directed into the body 221a, 221b of each component 200a, 200b, rather than into the respective adjacent magnet 218b, 218a, and may not interfere or repel, regardless of the polar orientation of the magnets 218a, 218b. By arranging the side magnets 218a, 218b in this manner, the lateral magnetic coupling mechanism between adjacent dies may be strengthened.

In some examples, the polar orientation of magnets 218a, 218b can be the oriented in the same direction (or complementary), such that the North pole of magnet 218b aligns with the South pole of magnet 218a. Magnets oriented in this manner may also be directly aligned upon assembly, i.e., not offset. Since the field will reinforce to generate a stronger magnetic coupling. In addition to creating a magnetic coupling effect along the lateral side surfaces 218a, 218b of the tooling bodies 220a, 220b, magnets 218a and 218b can also be arranged to provide a secure magnetic flux coupling suitable, e.g., to prevent one or both components 200a, 200b from tipping, particularly for the case of narrow dies 200a, 200b, which may lack a set screw or other mechanical coupling to the holder.

In additional embodiments, one component 200a may be provided with a magnet 218a disposed in or along the lateral side 220a, and adapted to induce a magnetic engagement between the respective side 220b of an adjacent component 220b, independent of the presence of a second magnetic element 218b. In these examples (and where magnets 218a and 218b are offset as described above), a suitable magnetic engagement can be induced by the flux coupling between each magnet 218a (or 218b) and the ferromagnetic material (e.g., magnetic steel) comprising the body 221b (221a) of the adjacent punch or die component 200b (200a). For non-magnetic body constructions (e.g., aluminum, titanium, and non-magnetic steel alloys), the coupling can be effected by aligning a magnet 218a (or 218b) with a suitable ferromagnetic element 218b (218a), positioned in overlapping engagement along the adjacent lateral sides 220a, 220b.

As shown in FIG. 3, first and second magnets 218a, 218b can be disposed along the first and second (opposing) lateral sides 220a, 220b of each respective tool body 221a, 221b for the adjacent tooling components 200a, 200b. Each of the magnets 118a, 118b is adapted for inducing magnetic engagement of the tooling components 200a, 200b by magnetic flux coupling with the adjacent tooling components 200b, 200a, disposed along the first and second lateral sides 220a, 220b, respectively. For example, the first and second magnets 218a, 218b can be aligned across the tool body 221a, 221b (e.g., using a single magnet disposed in a transverse through-hole), or disposed in an offset relationship along the first and second lateral sides 220a, 200b. In these embodiments, the offset relationship can be selected for inducing the magnetic engagement with the first and second adjacent tooling components 200a, 200b each having first and second magnets 218a, 281b, along the adjacent sides 220a, 220b, without reference to polarity since the magnetic elements 218a, 218b do not align or overlap when the tooling components 200a, 200b are adjacent (e.g., with tangs 206a, 206b engaged in the holder and working ends 204a, 204b aligned for operation on a sheet metal workpiece).

Figure 4A:
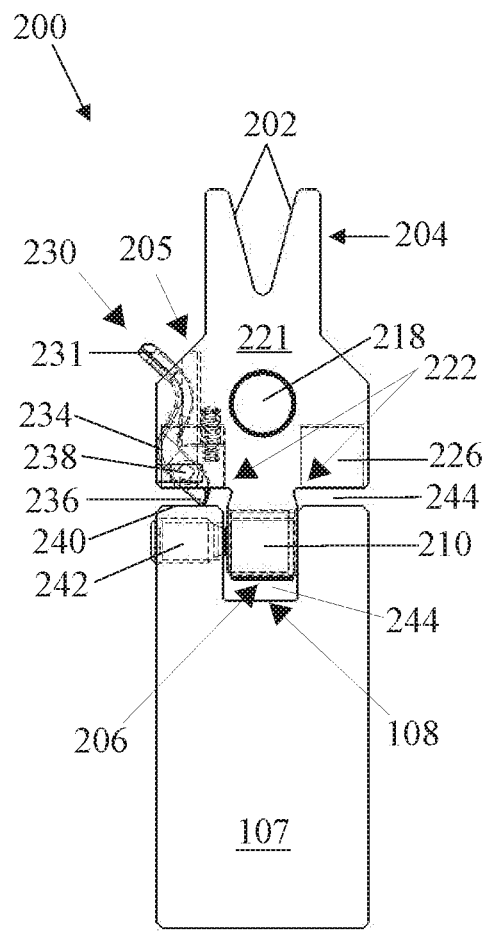
FIG. 4A is a side view of the die of FIG. 2 and a die holder showing the internal components of the die and die holder in a first disengaged configuration.

FIG. 4A is a side view of a forming die 200 and die holder 107, showing the internal components in a first disengaged configuration. As shown, the lever mechanism 230 may define a first (intermediate) leveraging portion 234 and a second leveraging portion (or end) 236, configured to rotate or pivot about a pin or hinge element 238. Below the load-bearing surface 240 of holder 107, a set screw 242 spans a shoulder portion of holder 107, contacting tang 206 at one end to mechanically engage the tool or die body 221 within the channel 108 defined along holder 107. A side-oriented magnet 218 is also shown, along with a vertically disposed shoulder magnet 226. In some examples, set screw 242 can be omitted. Further, the number of set screws 242 required in a given die holder 107 can be reduced, due to the magnetic coupling mechanisms included in the tool and die components 200 described herein.

Lever mechanism 230 is configured to selectively switch die 200 between engaged and disengaged configurations with respect to holder 107. Under the control of an operator, the mechanism 230 mechanically leverages or pries die 200 away from holder 107, overcoming the retaining strength of the magnetic circuit induced between the magnets within the die and the ferromagnetic material of the holder. The portions of the mechanism 230 configured to push against the holder, i.e., first and second leveraging features (e.g., "pushing" portions or similar working processes) 234 and 236 may be shorter in length than the remainder of the lever, i.e., the first end or "handle portion" 231, which is accessible to the operator for actuating mechanism 230. This particular configuration, in which the working portion 234, 236 is shorter than the handle portion or (first) actuator end portion 231, may reduce the force needed to actuate the lever and disengage the die. In the first disengaged configuration shown, the handle portion 231 of the lever mechanism 230 has been moved upward toward working end 204 of the die 200, which causes second leveraging portion 236 to rotate about pin 238 and directly contact and push down against load-bearing surface 240 on holder 107. Movement of the lever mechanism 230 in this manner may create an air gap 244 between surface 240 of holder 107 and the die 200, which substantially reduces the strength of the magnetic flux coupling between the two components. In some examples, only one lever or similar release mechanism 230 may be sufficient to create the desired separation between die 200 and holder 107, to release the die from the holder. A lever in the middle may push the entire die away from the holder or at least create a tilt from one side. A single lever close to one end may reduce the magnetic coupling strength enough to disengage or "peel" the die away from the holder from that same end. In other embodiments, two or more levers or release mechanisms 230 may be used. In still other embodiments, the lever mechanism 230 may be absent, for example if the strength of the magnetic coupling is easily overcome by manual lifting and separation of the die 200 from the holder 107, or by manipulation of the die 200 at working end 204.

Figure 4B:
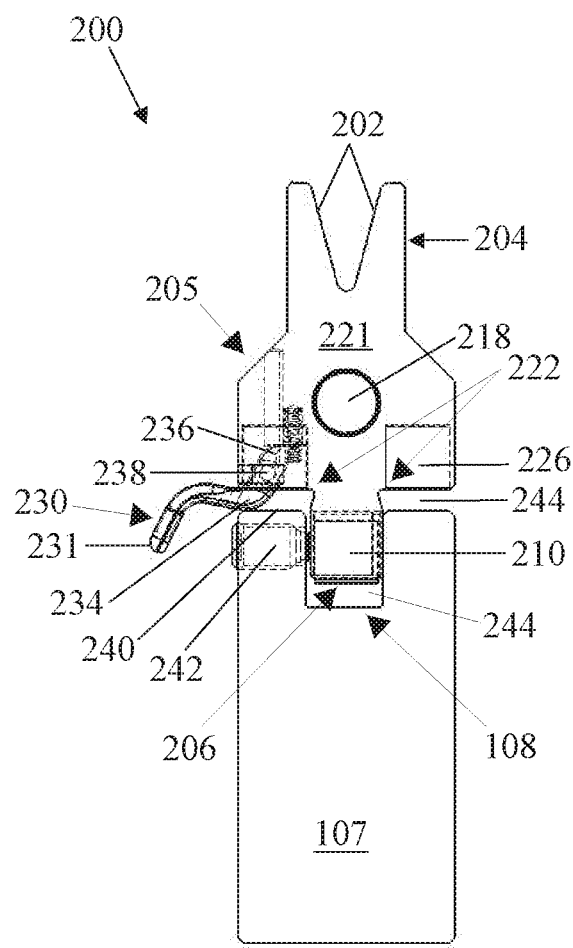
FIG. 4B is another side view of the die and die holder of FIG. 4A showing the internal components of the die and die holder in a second disengaged configuration.

FIG. 4B is another side view of forming die 200 and die holder 107, showing the internal components in a second disengaged configuration. The disengagement mechanism 230 has a first end or handle portion 231 moved or oriented downward in this configuration, away from working end 204, causing first leveraging portion 234 to directly contact and push down against load-bearing surface 240 of die holder 107, creating air gap 244. Thus, FIGS. 4A and 4B illustrate that the handle portion 231 of release mechanism 230 can be configured to move in two generally opposed directions, e.g., toward and away from working end 204 of the punch or die component 200. Movement in either direction can create separation between die 200 and the holder 107, thereby facilitating removal of the die from the holder by weakening the magnetic flux coupling therebetween.

More generally, a variety of suitable release mechanisms 230 can be configured for selective disengagement of the coupling end 205 of the tool or die body 221 body from the holder 107. Typically, the release utilizes a lever-type mechanism 230 with a first end or handle portion 231 accessible by a user, and one or more leveraging sections 234, 236 engaged between the tool or die body 221 and the holder 107. The first end or handle section 231 is adapted for manipulation by a user or operator, and the second sections 234 and 236 are configured to urge at least a portion of the coupling end 205 of the tooling component 200 from the holder 107, in order to define an air gap 244 between the coupling end 205 of the tool or die body 221 and the adjacent surface 240 of the holder 107. In embodiments with a tang 206, for example, one or more gaps 244 can be formed between the bottom shoulder features 222 on the tool or die 200 and the top surface 240 of the holder 107, and between the bottom of the tang 206 and the lower surface of the coupling channel 108. The gaps 244 substantially reduce the strength of the magnetic coupling between the holder 107 and the vertical tang magnets 210 or shoulder magnets 226 (or both), on the coupling end 205 of the tool or die body 221, allowing for removal of the tool component 200.

As shown in FIGS. 4A and 4B, for example, the release mechanism comprises a lever member or rocker mechanism 230 engaged with the body 211 of the tooling component 200, e.g. via a hinge pin or similar pivotable engagement 238. The lever mechanism 230 extends from a first end or handle 231 adapted for operation by a user to a second end 236 adapted to selectively disengage the coupling end 205 of the tooling component 200 from the holder 107, upon operation of the first end 231.

In this particular configuration, the release mechanism 230 is bidirectional. When the first end 231 of the lever 230 is manipulated in a first (upward) direction, for example, as shown in FIG. 4A, the second end 236 protrudes from the bottom shoulder 222, urging the component 200 from the holder 107 and forming one or more gaps 244 between the coupling end 205 of the tool component 200 and the holder 107. When the first end 231 of the release mechanism 230 is manipulated in a second (downward) direction, as shown in FIG. 4B, the second end 236 is recessed within the body 221 of the tool component 200, and the "elbow" feature defined by the working portion 234 protrudes from the bottom of shoulder 222, between the first end 231 of lever mechanism 230 and the second end 236, urging the coupling end 205 of the tool or die body 221 from the holder 107 to form one or more gaps 244.

One or more load-bearing shoulders 222 can be defined on the coupling end 205 of the tool or die body 221, e.g., in order to bear a mechanical load between the holder 107 and the tooling component 200 when the press brake operates to form a workpiece with the working end 204. When the first end 231 of the lever mechanism 230 is manipulated upward or downward, either the second end 236 or the intermediate elbow portion 234 protrudes from the load-bearing shoulder 222 to selectively disengage the coupling end 205 from the holder 107, forming air gaps 244.

Figure 5:
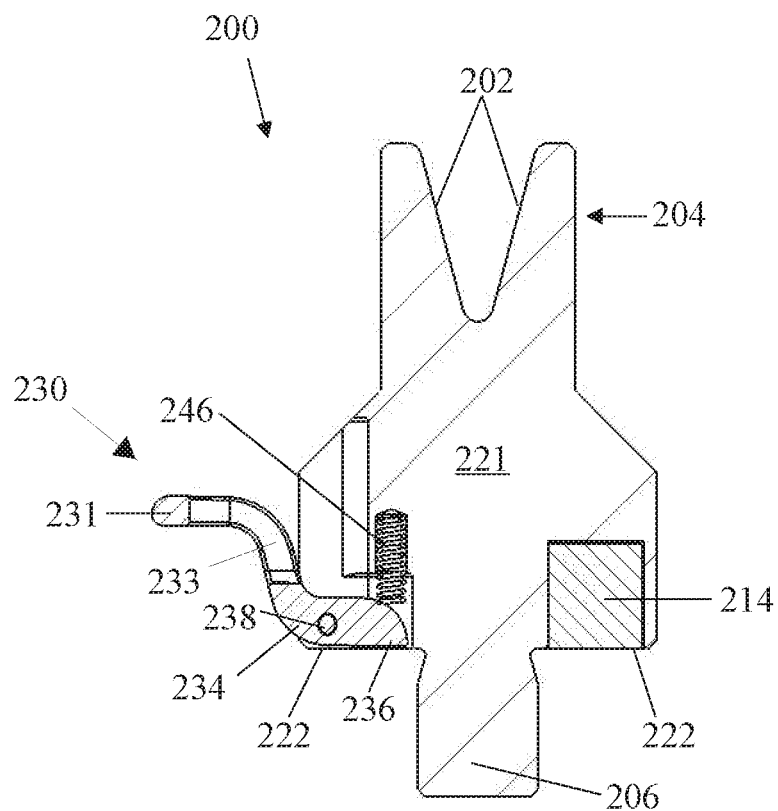
FIG. 5 is a section view of the die of FIG. 2, showing a decoupling actuator or lever having a handle or actuator portion biased by a spring.

FIG. 5 is a section view of die 200 in a resting configuration, with concave forming surface 202 oriented upward for operation on a workpiece. When coupled with a die holder, the resting configuration may correspond to a locked or engaged configuration. As shown, first leveraging portion 234 and second leveraging portion 236 are positioned above or at least flush with the bottom plane of shoulder 222 in the resting configuration. Lever member 230 can be biased to this configuration by spring 246, which pushes against second leveraging portion 236 when extended. Movement of the handle portion 231 of the lever mechanism 230 away from the working end 204 of the tool component 200 compresses a spring 246 within the body of the die. Accordingly, release of the lever 230 may allow the spring 246 to extend once, returning mechanism 230 to its resting state. Spring 246 may also prevent the handle portion 231 of the lever mechanism 230 from succumbing to gravity and moving away from working end 204 unless pushed in that direction by a user, thus ensuring that the lever does not interfere with installation or storage of the die. In various embodiments, multiple springs may be included within the die, to provide the desired biasing force.

As shown in FIG. 5, the lever or similar release mechanism 230 is pivotably engaged with the body 221 of the tooling component 200, e.g., by a pin, hinge or similar pivot element 238 (see also FIGS. 4A, 4B). The mechanism 230 is configured to urge the coupling end of the tooling component 200 from the holder, responsive to operation of the first end 231 in each of first and second opposing directions (e.g., up and down).

In this particular example, the actuator comprises a rocker or lever member 230 with a first longitudinal portion extending from the first end 231 to a transverse portion 233, and a second longitudinal portion extending from the second end 236 to the intermediate elbow portion 234, at the distal end of the transverse portion 233. The second longitudinal portion is pivotably engaged with the body 221 of the tooling component 200 between the elbow 234 and the second end 236, in order to urge the coupling portion 205 from the holder in response to operation of the first end 231 in a first (upward) or second (downward) direction.

Figure 6:
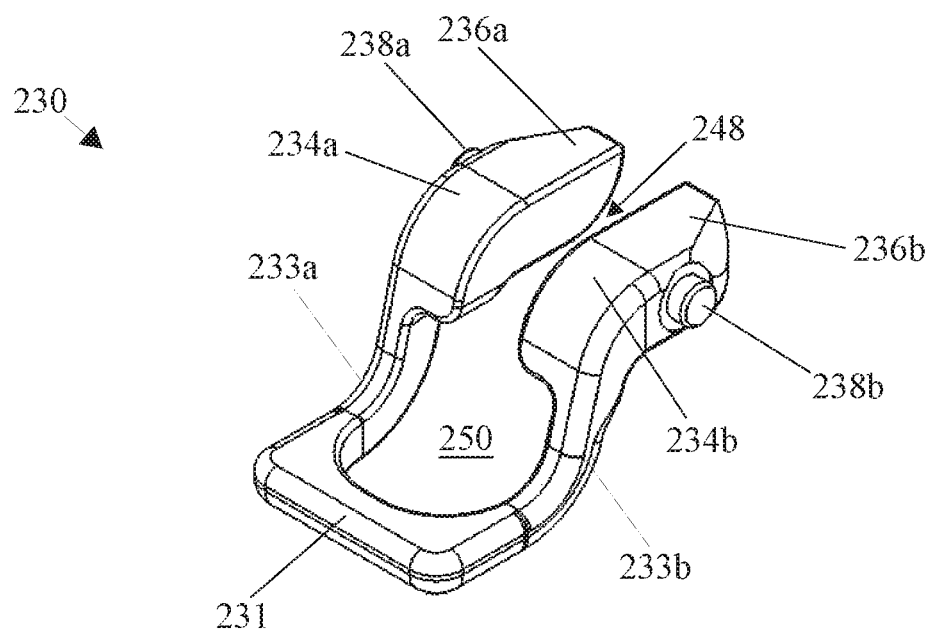
FIG. 6 is an isometric view of the lever of FIG. 5.

FIG. 6 is an isometric view of a lever-type actuator or similar release mechanism 230, showing the underside of the lever when arranged in the configuration shown in FIG. 5. As shown, mechanism 230 may define a first leg section comprising first leveraging portion or intermediate elbow 234a and second leveraging portion or end 236a, each configured to rotate or pivot about pin feature 238a. The second leg section includes first leveraging portion or intermediate elbow 234b and second leveraging portion or end 236b, configured to rotate or pivot about pin 238b. Together, the two leg portions define a narrow slot of channel 248 extending between the ends 236a, 236b and the intermediate elbows 234a, 234b to a center aperture 250 defined between the transverse sections 233a, 233b, and joined together first end 231.

The pins 238a, 238b create a pivot axis or fulcrum about which lever or rocker 230 can rotate bi-directionally upon actuation by a user. Narrow slot 248 and aperture 250 provide a biased arrangement of the two leg sections, enabling a snap-fit functionality such that release mechanism 230 may be manually engaged within and removable from the body of the punch or die component. For example, center aperture 250 can define a biasing strength that allows the leg sections of the rocker 230 to compress and expand during installation and removal. Compressing the leg sections decreases the width of the slot 248 and the separation of the second ends 236a, 236b, for insertion of mechanism 230 into a cavity defined within the press brake tool or die body, in pivoting engagement via pin features 238a, 238b. Periodic removal of the release mechanism 230 is also possible, e.g., for maintenance or when additional clearance is desired to position a workpiece that may require bending in multiple directions. In such applications, mechanism 230 can be removed to clear a space for the workpiece, and then re-installed for removal of the punch or die component after the workpiece is formed.

Figure 7:
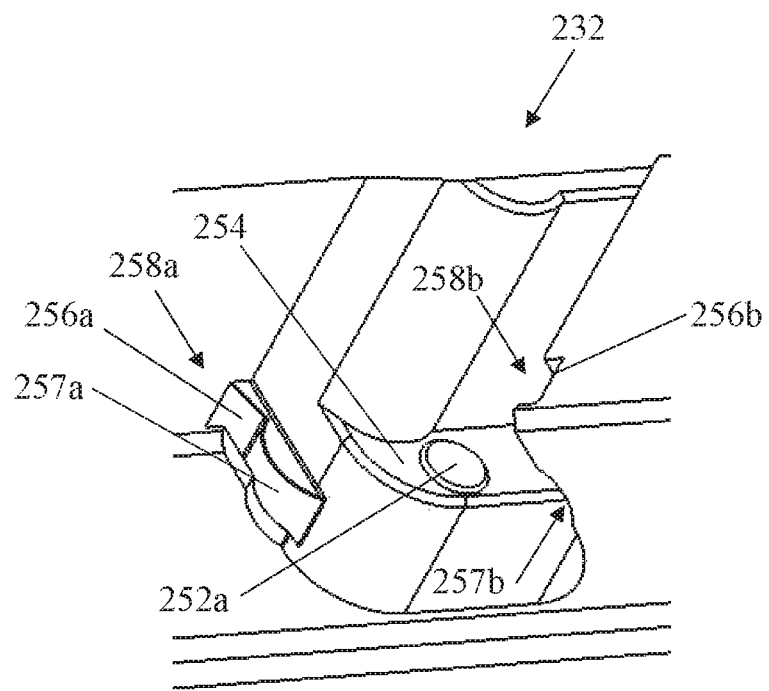
FIG. 7 is an isometric view of a cavity configured to receive the lever of FIG. 6.

FIG. 7 is an isometric view of cavity 232, which is configured to receive and mount a manual release actuator, such as a lever-type release mechanism 230. Cavity 232 may be machined into the body of die 200, and may define at least one round spring pocket 252a for mounting an end of spring 246. A protruding ledge 254 may act as a stop that prevents the second leveraging portions or features 236a, 236b on the end of the lever member 230 from overextending past the spring, when the handle portion 231 of the lever mechanism 230 is pushed away from the working end of the die.

In addition, cavity 232 may define several features configured to engage or disengage release mechanism 230 when urged into or out of the cavity by a user. For example, two opposing pairs of ramped or beveled portions 256a, 256b can be defined on the sides of cavity 232 to provide angled surfaces configured to facilitate temporarily compressing or collapsing the leg portions of mechanism 230 upon insertion and/or removal. Side pockets 258a, 258b may receive pivot pins 238a, 238b on each leg portion, respectively, when sliding mechanism 230 into the cavity or recess 232. The side pockets may be key-cut style side pockets, as shown. After sliding the pivot pins 238a, 238b on each arm of the lever mechanism 230 past the beveled engagement portion of surfaces 256a, 256b, the compressed lever mechanism can expand, snapping pivot pins 238a, 238b into place within the adjacent (e.g., "half-moon" shaped) pin recesses 257a, 257b.

Figure 8:
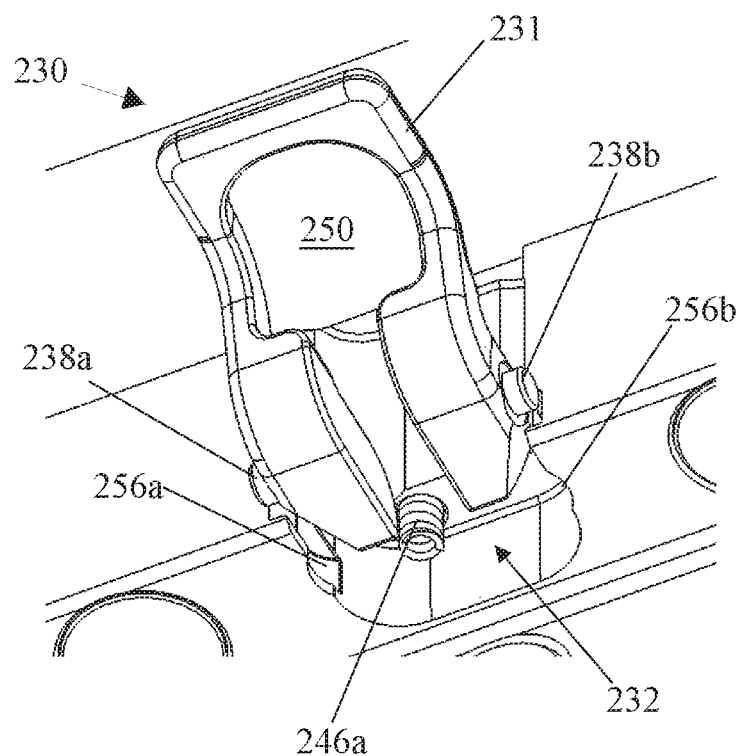
FIG. 8 is an isometric view of the lever of FIG. 6 just prior to installation within the cavity of FIG. 7.

FIG. 8 is an isometric view of a suitable lever or rocker-type release mechanism 230, prior to installation within cavity 232. Before installation, pivot pins 238a, 238b are aligned with opposing beveled engagement surfaces 256a, 256b, e.g., as defined by being milled into the side walls of the cavity 232. As mechanism 230 and pivot pins 238a, 238b are pushed into engagement along angled surfaces 256a, 256b, the leg portions collapse or compress inwardly (toward each other), until the domed ends of the pivot pins 238a, 238b traverse past the ramped surfaces 256a, 256b sufficiently so that pin features 238a, 238b can snap into place and engage within the indented portions 257a, 257b of the pockets or cavities 258a, 258b. To remove mechanism 230 from cavity 232, the legs can be squeezed together, e.g., manually or with the aid of a tool such as a pliers, in order to disengage the pin features 238a, 238b from pockets 258a, 258b, and remove mechanism 230 from the cavity or recess 232. The number of levers and corresponding cavities included in a given die may vary, ranging from one to about three, five, seven, ten or twelve magnets, or more, depending on embodiment. In addition or alternatively, one or more such levers or similarly release mechanisms may be included in a suitable die holder, e.g., die holder 107.

Figure 9A:
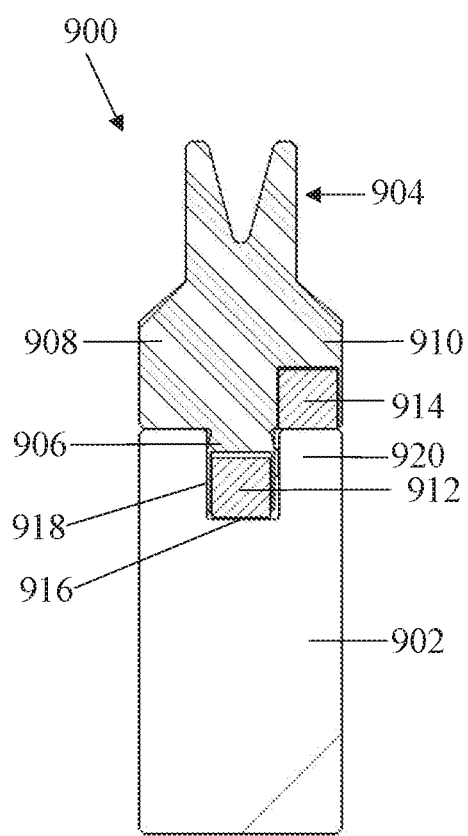
FIG. 9A is a section view of a die coupled with a die holder, showing an arrangement of a magnetic coupling assembly.

FIG. 9A is a section view of a die 900 coupled with a die holder 902, showing an arrangement of a magnetic coupling assembly. As shown, die 900 defines a working end 904, a coupling end or tang 906, and two opposing shoulder portions 908, 910. Within tang 906, the die includes a vertically disposed tang magnet 912. Within shoulder portion 910, the die includes a shoulder magnet 914.

In the configuration shown, one or more tang magnets 912 may protrude beyond the bottom surface of tang 906, positioning tang magnet 912 in direct contact or at least in close proximity to a bottom surface 916 of the mounting slot 918 defined by die holder 902. In some examples, tang magnet 912 can be movable within tang 906, such that the position of tang magnet 912 is adjustable. In other embodiments, tang magnet 906 can be fixed at the position shown. Positioning tang magnet 912 such that it protrudes beyond tang 906 may be necessary to close or minimize an air gap between a bottom surface of tang 906 and a bottom surface 916 of mounting slot 918. Tang magnet 912 may protrude different distances from a bottom surface of the tang to accommodate different tang heights, such that the tang magnet protrudes more when embedded in a shorter tang.

Shoulder magnet 914 may contribute to the magnetic coupling induced by tang magnet 912. In some examples, the polar orientation of tang magnet 912 and shoulder magnet 914 may be the same, thereby inducing a magnetic circuit that involves tang magnet 912, shoulder magnet 914, and portions of the body of die 900 and die holder 902. In some embodiments, tang magnet 912 and shoulder magnet 914 may be involved in distinct magnetic circuits, securing the tang 906 to the mounting slot 918 and the shoulder portion 914 to a load-bearing surface 920 of the die holder, respectively. One or more magnets can be used in this combination in either surface location.

Figure 9B:
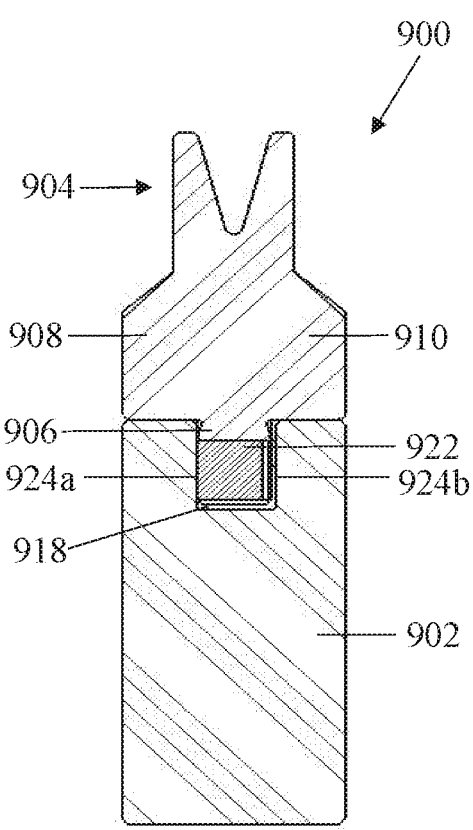
FIG. 9B is another section of view the die and die holder of FIG. 9A, showing an arrangement of horizontally disposed tang magnets.

FIG. 9B is another section of view die 900 coupled with die holder 902, showing an arrangement of a horizontally disposed tang magnet 922. As shown, one or more of tang magnet 922 may be flush with a side surface of tang 906, such that the magnet directly contacts vertical mounting wall 924a of mounting slot 918. In some examples, tang magnet 922 may span the entire width of tang 906, such that the magnet contacts vertical mounting walls 924a and 924b. In some embodiments, tang magnet 922 may not directly contact one or both vertical mounting walls 924a, 924b, but both ends of the magnet may still be close enough to the vertical mounting walls to create a dual magnetic coupling effect on both sides of the mounting slot.

Figure 10A:
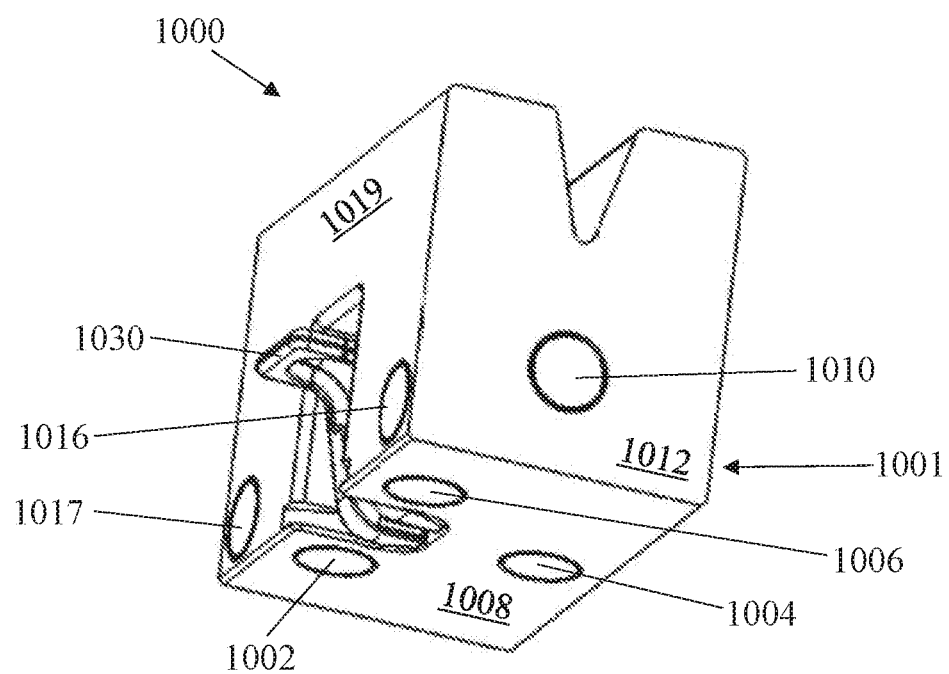
FIG. 10A is an isometric view of a die lacking a spud or tang.

FIG. 10A is an isometric view of a die 1000 lacking a spud or tang. Without a narrow tang, coupling end 1001 of die 1000 can be the same or similarly dimensioned relative to the body of the die. Die 1000 may thus fit into a die holder defining a wider receiving portion, slot or cavity relative to, for example, die holder 107 shown in FIG. 1. Die 1000 includes three vertically disposed magnets 1002, 1004, 1006 exposed at a bottom surface 1008. Die 1000 also includes a magnet 1010 exposed at a sidewall 1012 and a lever-type release mechanism 1030. Die 1000 further includes two horizontally disposed magnets 1016, 1017 exposed at a front wall 1019, the front wall arranged perpendicularly with respect to bottom surface 1008. When placed in a corresponding holder, magnets 1002, 1004, 1006 can create a magnetic coupling effect with an adjacent, horizontal mating surface defined by a load-bearing portion of a die holder. The horizontally disposed magnets 1016, 1017 can provide a magnetic coupling effect in a punch or die component, without a protruding tang on the coupling end. This magnetic coupling is similar to that generated by a magnet 914 or 922, shown in FIGS. 9A and 9B, depending on pole orientation. Similar magnets 1010 can be disposed in or exposed on opposing side walls 1012 of the die 1000; e.g., on the outward-facing side surface 1012 as shown (directed out of the page in FIG. 10A), on the opposite-facing side surface (directed into the page in FIG. 10A), or both. Horizontally disposed magnets can also be distributed on the front side of the tool or die body, on the back side, or both.

Figure 10B:
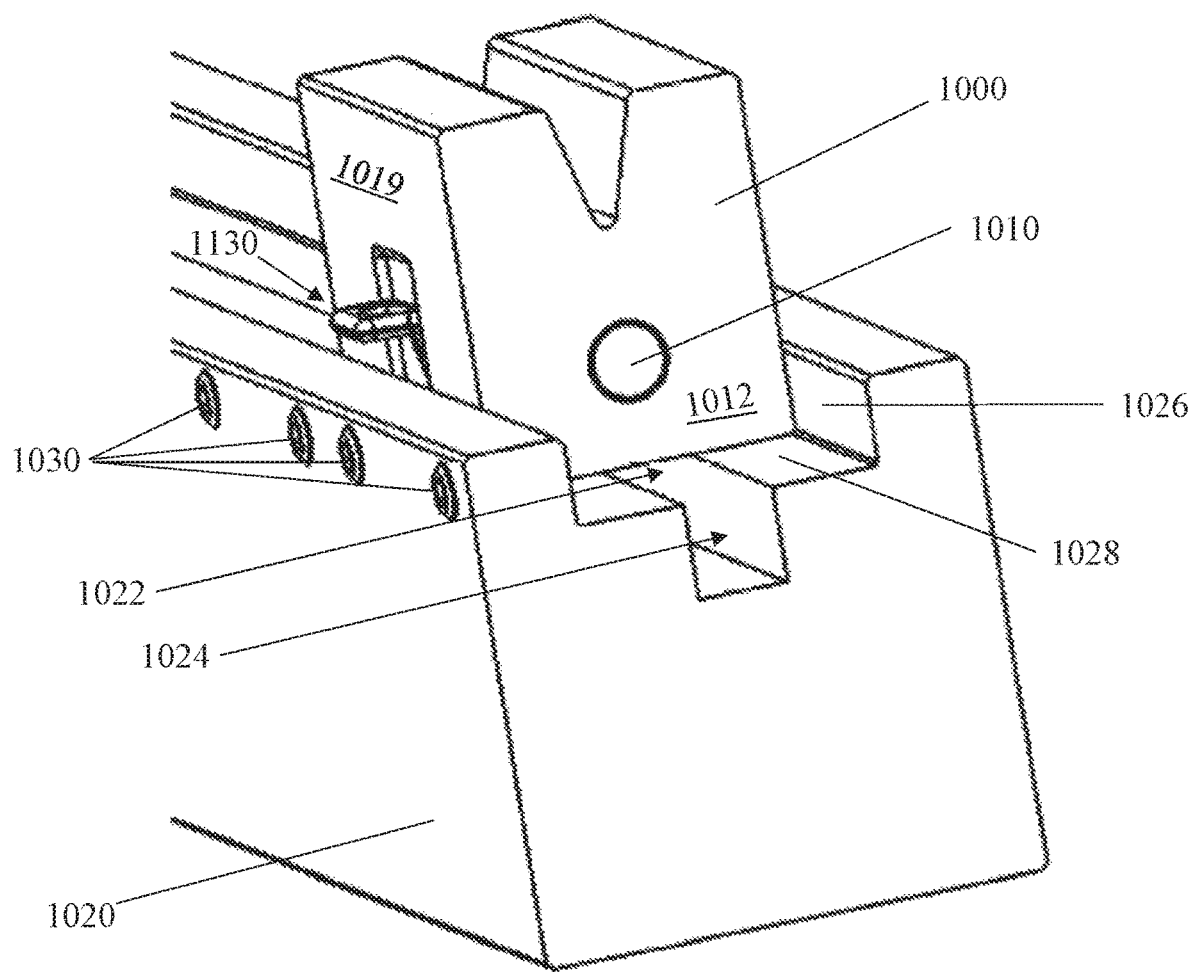
FIG. 10B is an isometric view of the die coupled with a die holder.

FIG. 10B is an isometric view of die 1000 coupled with a die holder 1020. As shown, die holder 1020 may define a cavity 1022, which narrows into a distinct mounting slot 1024. Mounting slot 1024 can receive a coupling end or tang defined by a die, while cavity 1022 has a broader width configured to receive coupling end 1001 of die 1000. Upon inserting die 1000 into die holder 1020, the horizontally disposed magnets 1016, 1017 shown in FIG. 10B can create a magnetic coupling effect with the vertical mating surface 1026 defined by cavity 1022, and the vertically disposed magnets 1002, 1004, 1006 of die 1000 can create a magnetic coupling effect with the horizontal mating surface 1028 defined by the cavity 1022, which may also serve as the load-bearing surface of die holder 1020. One or more set screws 1030 can be tightened against front surface 1019 of die 1000 to secure the die to die holder 1020, or a clamping mechanism can be used. The number of horizontally and vertically disposed magnets included in die 1000 can vary, depending for example on the weight of die 1000, as greater or fewer magnets may be necessary to prevent lateral sliding of the die within cavity 1022.

Figure 11:
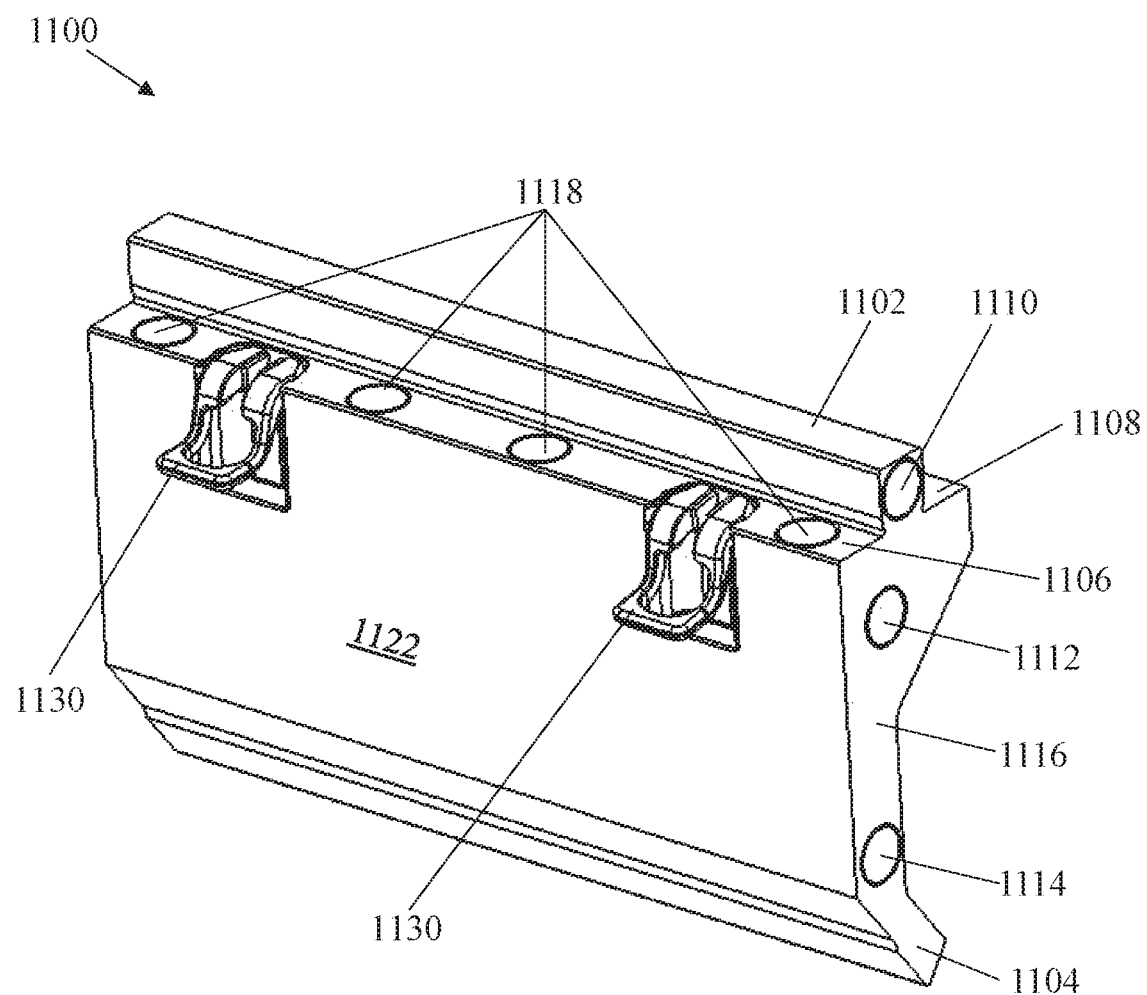
FIG. 11 is an isometric view of a forming tool configured for magnetic engagement with a tool holder, in a representative press brake apparatus.

FIG. 11 is an isometric view of a forming tool configured for magnetic engagement with a tool holder. Tool 1100 may be configured for magnetic engagement with a corresponding tool holder in an upper table of a press brake apparatus, generally opposite, e.g., above, a forming die. As shown, tool 1100 may define a coupling end or tang 1102 and a working end 1104. Two shoulder portions 1106, 1108 may protrude outward at the base of the tang, which may include a tang magnet 1110 horizontally disposed therein. Two additional magnets 1112, 1114 may be exposed at one or the other end of the side surface 1116. A plurality of vertically disposed shoulder magnets 1118 are disposed within shoulder portion 1106, and two lever members 1130 are coupled within cavities defined by a front surface 1122 of the tool.

Collectively, the magnets included in tool 1100 comprise a magnetic coupling mechanism analogous to the magnetic coupling mechanism of die 200. The coupling mechanism may be used to couple tool 1100 with a corresponding tool holder while arranging or staging additional tools within the holder. In some embodiments, the coupling mechanism may provide a safety mechanism for temporarily coupling tool 1100 with a holder, for example before an additional clamping mechanism is activated and the press brake apparatus begins operating to form a workpiece. In some examples, the magnetic coupling mechanism may suffice to secure tool 1100 with a holder without additional support. Depending on embodiment, suitable side magnetic coupling configurations for a die component can also be used on a forming tool or punch. Additionally, like a die tool, a side coupling magnet configuration can be used with other suitable magnetic couplings along any combination of the front, back, top and bottom surfaces of the tool body, either adjacent to the holder or, along adjacent punch or die tool surfaces.

The magnets 1110, 1112, 1114 included in tool 1100 may be configured to reversibly couple tool 1100 with an adjacent tool, along the lateral side 116. In some examples, one or more magnets are only necessary in one of two adjacent tools to create a magnetic flux coupling between the tools that is sufficient to secure the tool lacking a magnet against side surface 1116. One or more magnets may be disposed at both sides of tool 1100. In addition or alternatively, one or more magnets may extend the entire width of the tool body, such that both ends of the magnet are exposed at the opposite side surfaces. Thus the number of side magnets, and the lengths of each magnet, may vary. In various embodiments, the number of magnets may range from one to about three, five, seven, ten or twelve magnets, or more, depending the tool or die length, width and mass.

The vertically disposed shoulder magnets 1118 can create a magnetic flux coupling between shoulder 1106 and a complementary load-bearing surface defined by a corresponding tool holder. Each shoulder magnet 1118 can be exposed at one end in the manner shown for direct contact with the mating surface of the tool holder. Shoulder magnets can be disposed within one or both shoulder portions 1106, 1108, and the number of shoulder magnets may vary, ranging from one to about three, five, seven, ten or twelve magnets, or more, in various embodiments.

Levers 1130 may be configured analogously with respect to lever member 230 of die 200. For example, as shown in FIG. 11, levers 1130 may be oriented upside-down relative to the orientation of lever mechanism 230. Under the control of an operator, each lever 1130 mechanically leverages or pries tool 1100 away from its holder, overcoming the retaining strength of the magnetic circuit induced by the magnets within the forming tool and the ferromagnetic material comprising the holder. Like a lever-type actuator mechanism 230, each lever 1130 shown in FIG. 11 may define first and second leveraging portions or similar features biased by respective springs. Each lever 1130 may also be configured to rotate bidirectionally about at least one pin mounted within a cavity machined into the body of the tool. The levers may be collapsible to facilitate insertion and removal.

Figure 12:
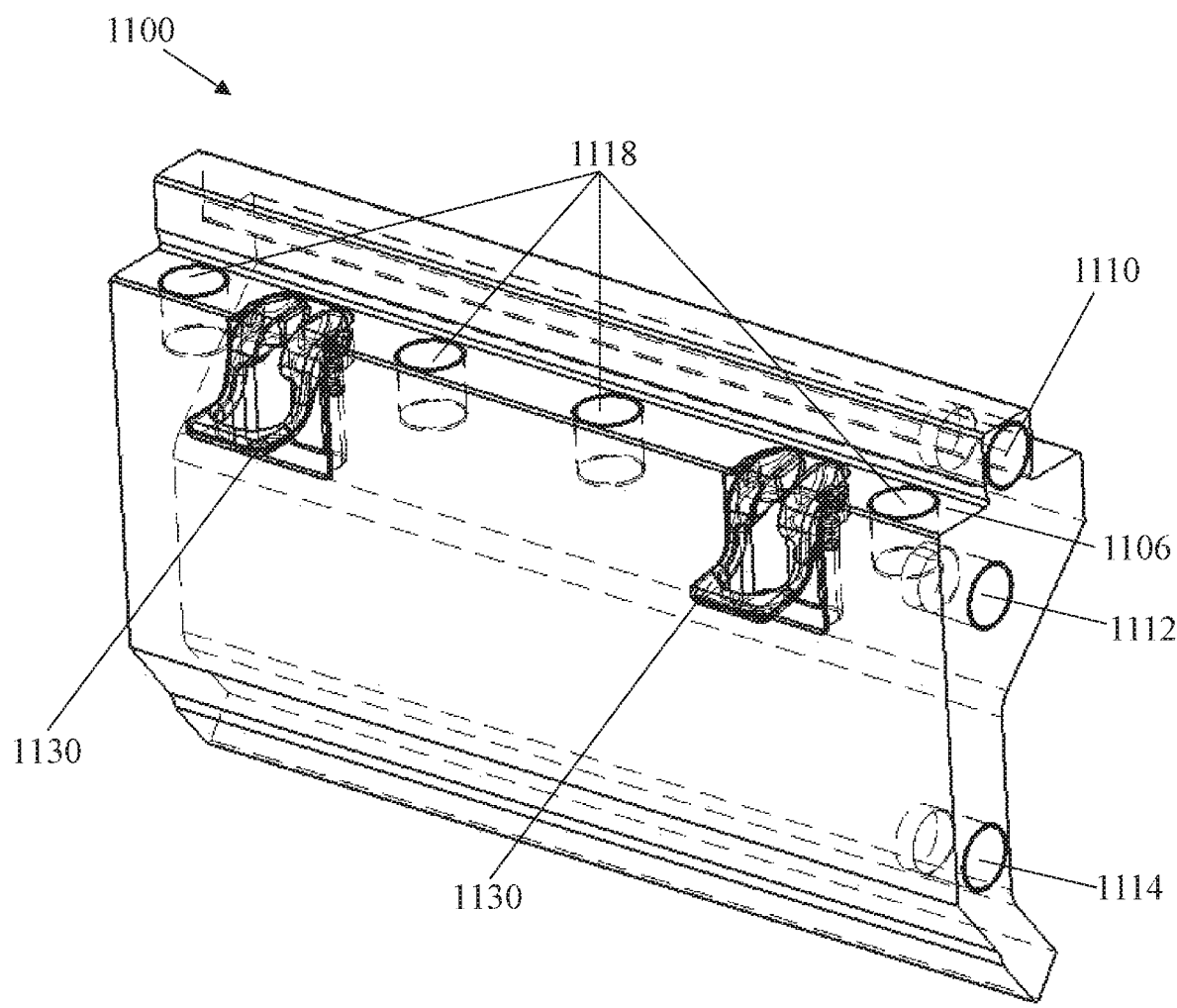
FIG. 12 is an isometric view showing the internal configuration of the engagement system and lever of the forming tool of FIG. 11.

FIG. 12 is an isometric view showing the internal configuration of the magnetic engagement system and lever member of tool 1100. As shown, shoulder magnets 1118 may be approximately cylindrical and may extend vertically within shoulder 1106. Side magnet 1110 may also be approximately cylindrical in shape and may extend horizontally within tang 1102. Side magnets 1112 and 1114 may also be approximately cylindrical and may also extend horizontally to a distance with the body of tool 1102. In some examples, magnets 1112, 1114 may be offset with respect to the magnets included in an adjacent tool, e.g., to generate a magnetic coupling and prevent the tools from repelling each other regardless of magnet polarity, similar to the magnet arrangement of the punch or die component shown in FIG. 3.

Figure 13:
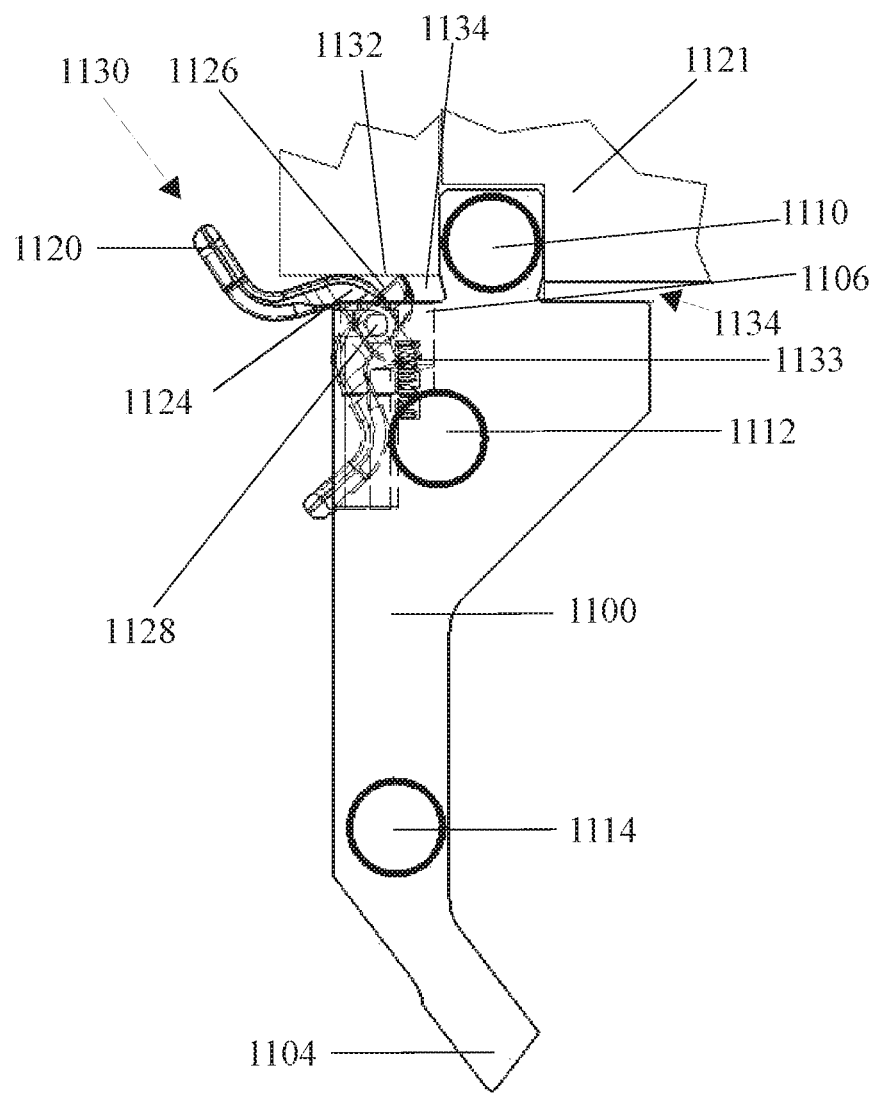
FIG. 13 is a side view showing the internal configuration of the lever and tool of FIGS. 11 and 12 in a disengaged configuration with respect to a tool holder, illustrating various magnetic element locations on the side wall of the tool.

FIG. 13 is a side view showing the internal configuration of a lever-type release mechanism 1130 for a tool 1100 in disengaged configurations, with respect to a tool holder 1121. The lever mechanism 1130 of the tool 1100 has an accessible end or handle 1120, and defines a first leveraging portion 1124 and a second leveraging portion 1126, each configured to rotate about pin 1128, with a spring 1133 included for biasing the lever 1130 toward a resting state. As shown, the lever handle portion 1120 may be configured to move toward working end 1104 of the tool 1100 in one configuration, and away from the working end 1104 in another configuration. In the first disengaged configuration shown, lever handle portion 1120 has been moved toward tool holder 1121, which causes first leveraging portion 1124 to rotate about pin 1128 and directly contact and push up against load-bearing surface 1132 of the tool holder. Movement of lever handle 1120 in this manner may create one or more air gaps 1134, e.g., between the mating surface 1132 of the holder and the adjacent surface of the tool 1100, that substantially reduces the strength of the magnetic flux coupling between the two components. In a second disengaged configuration, lever 1130 has been moved away from tool holder 1121 and toward working end 1104, causing second leveraging portion 1126 to directly contact and push up against load-bearing surface 1132 of the tool, again creating air gap 1134. In some examples, movement of only one lever may create the requisite separation between the tool and its holder to release the tool therefrom. In some examples, movement of two or more levers may be required. In addition or alternatively, one or more levers may be coupled with tool holder 1121.

Spring 1133 can be configured to bias lever 1130 toward a resting configuration that may correspond to a locked or engaged configuration when coupled with holder 1121. In particular examples, spring 1133 can push up against a portion of lever 1130, e.g., end portion 1126, which causes the first and second leveraging features 1124, 1126 to be positioned below or at least flush with the bottom plane of shoulder 1106. Movement of lever handle 1120 away from working end 104 compresses spring 1133 within the body of the die. Accordingly, release of handle 1120 may allow spring 1133 to extend once again, back to a resting state. For example, a punch or die component 1100 may include a biasing element 1133 engaged with the lever member 1130, with the biasing element 1133 configured to engage the lever member 1130 in a neutral position selected for operation of the first end or handle 1120 in each the first and second opposing directions from the neutral position, respectively. Thus, the lever or rocker member 1130 can be biased in a neutral or middle position with the tool or punch component 1110 engaged in the holder, where the neutral or middle position is defined by the first end 1120 being located between the position defined by operation of the lever or rocker member 1130 to disengage the punch or die component 1110 in the first opposing direction, and the position defined by operation of the lever or rocker member 1130 to disengage the punch or die component 1110 in the second opposing direction.

EXAMPLES

A suitable press brake apparatus can comprise one or more of: a tool body having a working end configured for operation on a workpiece and a coupling end configured for selective engagement with a holder, the working end spaced from the coupling end along the tool body; and one or more magnetic elements disposed in the tool body for selective engagement within the press brake apparatus by magnetic coupling with the tool body, wherein the working end is configured for forming the workpiece by operation of the press brake apparatus.

The one or more magnetic elements can be disposed along a lateral side of the tool body to induce the magnetic coupling with an adjacent tool body having an adjacent working end, the respective working ends adapted for cooperatively forming the workpiece upon operation of the press brake apparatus.

One or more set screws may be disposed along the holder for mechanical engagement with the coupling end of the tool body, wherein the magnetic coupling is adapted to maintain the adjacent tool body upright in the holder upon operation of the press brake apparatus, absent engagement with such a set screw.

The one or more magnetic elements may comprise one or more magnets disposed along first and second lateral sides of the tool body, the magnets adapted for magnetic coupling with first and second adjacent tool bodies disposed along the first and second lateral sides, respectively.

The magnets can be offset from one another along the first and second lateral sides, the offset selected for non-overlapping engagement with magnets similarly disposed along respective lateral sides of the adjacent tool bodies.

The working end of the tool body defines a tool or die or punch surface adapted for forming the workpiece by operation of the press brake apparatus.

The one or more magnetic elements can comprise one or more magnets disposed in the coupling end of the tool body to induce the magnetic coupling between the coupling end and the holder.

An actuator or decoupling mechanism can be engaged between the tool body and the holder, the mechanism configured to selectively urge the coupling end of the tool body from the holder to define an air gap therebetween. The mechanism may be pivotably engaged with the tool body, e.g., using a lever- or rocker-type mechanism that extends from a first end or handle adapted for operation by a user to a second end with one or more working portions adapted to selectively urge the coupling end of the tool body from the holder, responsive to operation of the first end in each of first and second opposing directions.

A suitable lever or rocker mechanism can comprise first and second leg portions extending from the first end to the second end, and defining a channel therebetween, the leg portions configured for biased engagement of the lever mechanism within the tool body, each leg having a pin feature pivotably engaged within a cavity defined at the coupling end.

Suitable methods of operation comprise one or more of: disposing at least first and second tool bodies in an adjacent relationship along respective sides thereof, each of the tool bodies extending from a working end configured for operation on a workpiece to a coupling end configured for selective engagement with a holder of a press apparatus; and magnetically engaging the first and second tool bodies, wherein a magnetic coupling is defined along the respective sides by one or more magnetic elements disposed therein; wherein the first and second tool bodies are configured for forming the workpiece by engagement with punch or die forming surfaces defined at the respective working ends.

The methods can also include engaging the first and second tool bodies with the holder at the respective coupling ends. The first and second tool bodies can be engaged with the holder together as a unit, e.g., in the adjacent relationship via the magnetic coupling defined along the respective sides. The first and second tool bodies can be individually engaged with the holder, e.g., via the magnetic coupling defined by disposing the second tool body in the adjacent relationship with the first tool body engaged with the holder. The coupling end of the first tool body can be secured to the holder with a set screw; e.g., for operating the press apparatus to form the workpiece, with or without securing the coupling end of the second tool body with such a set screw.

Suitable methods may also include one or more of magnetically engaging at least the first of the punch and die tool bodies with the holder, e.g., where a magnetic coupling is defined between the holder and the respective tool body by one or more magnetic elements disposed therein; and manipulating a release actuator or lever-type mechanism engaged with the respective tool body, for decoupling the respective body from the holder thereby.

Manipulating the release mechanism can comprise one or more of: urging the coupling end of the respective tool body from the holder and defining an air gap in a magnetic flux path therebetween; and manipulating the lever mechanism in one or both of first and second opposing directions, wherein the lever mechanism is adapted for decoupling the respective tool body from the holder by manipulation in each of the opposing directions. The lever mechanism may have first and second opposing leg sections in biased engagement within the respective tool body, and further comprising compressing the opposing legs and disengaging the lever mechanism from the respective body thereby.

Suitable methods of operating a press brake apparatus can also be performed according to any of the examples and embodiments above. Additional applications of the mechanisms and techniques described in this disclosure include, but are not limited to, the following enumerated examples and embodiments.

A press brake tool has a tool body die having a working end configured for operation on a workpiece and a coupling end configured for selective engagement with a tool holder. The working end is disposed generally opposite the coupling end. The coupling end comprises a flat surface or a downwardly facing spud where the sidewalls are equally or un-equally distanced from the vertical sidewalls of the die to provide a locating feature known as a tang. The coupling end further comprises a magnetic element with one or more fixed or encapsulated magnets or one or more magnetic strips configured to generate a magnetic coupling adapted for the selective engagement of the coupling end of the tool body die with a die tool holder in any location where the die and tool holder have adjacent surfaces.

Any adjacent surface of the die and the holder may form a coupling end of the die tool body such that the adjacent surface can be adapted for the selective engagement with the tool holder, where the magnetic element is configured to generate the magnetic flux coupling between the adjacent surfaces of the tool holder and die.

In any of the above examples and embodiments, the magnetic element may be disposed on the flat bottom of the coupling end of the die configured to generate the magnetic flux coupling with the tool holder through one or both of a bottom surface and one or both side surfaces of the die to the adjacent walls of the tool holder.

In any of the above examples and embodiments, the magnetic element may be disposed within the downwardly facing spud and configured to generate the magnetic flux coupling with the tool holder through one or both of the bottom surface of the spud and one or both side surfaces of the spud to adjacent walls of the tool holder.

In any of the above examples and embodiments, the magnetic elements may equal or nearly equal the width of the tang so as to be used as the coupling element on both sides of the tang.

In any of the above examples and embodiments, the magnetic element on a given die coupling surface may hold the die to the tool holder in any location along the die holder where the die and tool holder coupling end have adjacent surfaces.

In any of the above examples and embodiments, one or more magnetic elements on a given die may be positioned in the sidewall of the die to hold it against the adjacent die side wall of any die without a magnetic side wall element to remove any gap in the two dies.

In any of the above examples and embodiments, two adjacent dies may both have side wall magnetic elements, whereby the magnetic poles of the magnetic elements in the side wall of the dies are oriented such that they attract each other allowing two dies with adjacent sidewall magnets to come together to remove any gap.

In any of the above examples and embodiments, two adjacent dies may both have side wall magnetic elements, whereby the magnetic elements in the side walls of the dies are staggered such that the magnet or magnets in each die do not interfere with the other die's magnetic attraction thus allowing the two dies with adjacent sidewall magnets to come together to remove any gap.

In any of the above examples and embodiments, a die with a side wall magnetic element may support a die during setup that is prone to falling over due to being narrow in length and/or width where the narrow die has no mounting space for a magnetic coupling element with the die holder.

In any of the above examples and embodiments, the magnetic elements on the given dies may be positioned in the sidewall of a die to hold the dies together in any location where the die and tool holder have adjacent surfaces and where there is no set screw to secure the narrow die.

In any of the above examples and embodiments, the magnetic elements on the dies may be configured in the sidewall of the dies to hold the dies together in any location where the die and tool holder have adjacent surfaces.

In any of the above examples and embodiments, the magnetic elements on the given dies may be positioned in the sidewall of the given dies to hold the dies together in any location where there are also magnetic coupling surfaces where the die and tool holder have adjacent surfaces.

In any of the above examples and embodiments, the die may be outfitted with a pry lever to partially separate the die from the die holder to reduce the magnetic force of the magnetic coupling or couplings for ease of die removal.

In any of the above examples and embodiments, the lever or decoupling actuator may be constructed to actuate up or down through pivot pins for operator preference.

In any of the above examples and embodiments, the lever may be constructed with a center slot which provides flexible legs such that the lever can be snapped in place for easy, fast assembly.

In any of the above examples and embodiments, the lever can be replaced when damaged by simply collapsing the legs to remove it.

In any of the above examples and embodiments, the lever can be removed temporarily by simply collapsing the legs when it is in the way of a forming operation.

In any of the above examples and embodiments, the lever cavity for holding the lever can be adapted to receive a spring which can be ideally placed so as to keep the lever in a horizontal position for ease of die installation and storage.

Is some embodiments, for example, a press brake apparatus is provided comprising a tool body having a working end configured for operation on a workpiece and a coupling end configured for selective engagement with a holder, the working end spaced from the coupling end along the tool body; and one or more magnetic elements disposed in the tool body for selective engagement within the press brake apparatus by magnetic coupling with the tool body. Depending on application, the working end of the tool body can define a tool, punch or die surface adapted for forming the workpiece by operation of the press brake apparatus.

The one or more magnetic elements can be disposed along a lateral side of the tool body to induce the magnetic coupling with an adjacent tool body having an adjacent working end, the respective working ends adapted for cooperatively forming the workpiece upon operation of the press brake apparatus. One or more set screws or a clamping mechanism may be disposed along the holder for mechanical engagement with the coupling end of the tool body, e.g., where the magnetic coupling is adapted to maintain the adjacent tool body upright in the holder upon operation of the press brake apparatus, absent engagement with such a set screw.

The one or more magnetic elements can comprise one or more magnets disposed along first and second lateral sides of the tool body, e.g., with the magnets adapted for magnetic coupling with first and second adjacent tool bodies disposed along the first and second lateral sides, respectively. For example, the magnets may be offset from one another along the first and second lateral sides, the offset selected for non-overlapping engagement with magnets similarly disposed along respective lateral sides of the adjacent tool bodies.

The apparatus can be adapted in an embodiment where the working end of the tool body defines a punch or die surface adapted for forming the workpiece by operation of the press brake apparatus. The one or more magnetic elements can comprise one or more magnets disposed in the coupling end of the tool body to induce the magnetic coupling between the coupling end and the holder, or disposed in the tool body to induce the magnetic coupling along one or both of the lateral sides of the tool body, e.g., with an adjacent tool body for a punch, tool or die component.

In any of these examples and embodiments, the apparatus can further comprise a release mechanism engaged between the tool body and the holder, e.g., with the release mechanism configured to selectively urge the coupling end of the tool body from the holder to define an air gap therebetween. Suitable release mechanisms can comprise a pivotable engagement with the tool body, and extend from a first end adapted for operation by a user to a second end adapted to selectively urge the coupling end of the tool body from the holder responsive to operation of the first end.

Depending on example, the first end of the release mechanism may comprise a lever or actuator adapted for manual operation of the release mechanism by a user of the press brake apparatus. The second end of the release mechanism may comprise first and second leveraging features adapted to selectively urge the coupling end of the tool body from the holder responsive to operation of the first end in first and second directions, respectively.

The pivotable engagement can be disposed along the second end of the release mechanism, the first and second leveraging features on opposite sides thereof. The first and second leveraging features can be operable in different directions in order to selectively urge the coupling end of the tool body from the tool holder, e.g., responsive to operation of the first handle or actuation end in the first and second directions, respectively. For example, the first and second directions may be substantially opposed, and the different directions may also be substantially opposed.

The release mechanism may comprise first and second leg portions extending from the first end to the second end and defining a channel therebetween, e.g., where the leg portions are configured for biased engagement of the release mechanism within the tool body. Each leg portion can have a pin feature pivotably engaged within a cavity defined at the coupling end of the tool body. A spring member can be engaged with the release mechanism, the spring member adapted to bias the release mechanism in a neutral position defined between operation of the first end in the first opposing direction and operation of the first end in the second opposing direction.

While this invention has been described with respect to particular examples and embodiments, changes can be made and equivalents can be substituted in order to adapt these teachings to other configurations, materials and applications, without departing from the spirit and scope of the invention. The invention is not limited to the particular examples that are disclosed, but encompasses all embodiments that fall with the scope of the claims.

The invention claimed is:

1. A punch or die component for a press brake apparatus, the punch or die component comprising:
   a tool body having a coupling end adapted for coupling with a holder and a working end adapted for operation on a workpiece; and
   one or more magnetic elements adapted for selective engagement of the punch or die component with an adjacent punch or die component within the press brake apparatus, wherein the one or more magnetic elements are configured for magnetic coupling with the adjacent punch or die component along a lateral side of the tool body;
   wherein the working end of the tool body is configured for forming the workpiece by operation of the press brake apparatus; and
   wherein the one or more magnetic elements are disposed along the lateral side of the tool body with a pole of each respective magnetic element oriented toward the lateral side and configured to induce the magnetic coupling with the adjacent punch or die component secured along the lateral side.

2. The punch or die component of claim 1, wherein the one or more magnetic elements comprise one or more magnets disposed in the tool body and adapted to generate magnetic flux with the pole oriented toward the lateral side to induce the magnetic coupling with the adjacent punch or die component.

3. The punch or die component of claim 1, wherein the one or more magnetic elements comprise one or more ferromagnetic guides disposed in the tool body and adapted to guide magnetic flux to induce the magnetic coupling with the adjacent punch or die component.

4. The punch or die component of claim 1, wherein a strength of the magnetic coupling with the adjacent punch or die component is adapted for insertion of the punch or die component and the adjacent punch or die component into the holder together as a unit, in adjacent relationship via the magnetic coupling along the lateral side.

5. The punch or die component of claim 4, wherein the strength of the magnetic coupling with the adjacent punch or die component is selected to maintain the adjacent punch or die component upright in the holder upon operation of the press apparatus to form the workpiece, absent mechanical engagement of the adjacent punch or die component to the holder with a set screw or clamping mechanism.

6. The punch or die component of claim 4, further comprising a tang or a flat bottom surface defined on the coupling end of the tool body and adapted for mechanical engagement with the holder.

7. The punch or die component of claim 1, wherein the lateral side of the tool body is a first lateral side and further comprising a second lateral side of the tool body, opposite the first lateral side, and wherein the one or more magnetic elements comprise first and second magnets disposed along the first and second lateral sides of the tool body, with the poles of the first and second magnets oriented toward the respective lateral sides for inducing magnetic couplings with one or more of said adjacent punch or die component disposed along one or both of the first and second lateral sides.

8. The punch or die component of claim 1, further comprising:
one or more magnets horizontally disposed in the coupling end of the tool body, such that poles of the one or more horizontally disposed magnets are oriented toward a front or back surface of the tool body when engaged with the holder; or
one or more magnets vertically disposed in the coupling end of the tool body, such that poles of the one or more vertically disposed magnets are oriented toward a top or bottom surface of the tool body when engaged with the holder.

9. The punch or die component of claim 8, further comprising a load-bearing surface defined on the coupling end of the tool body to bear a mechanical load between the holder and the tool body upon operation of the working end, wherein the one or more magnets are disposed in the load-bearing surface.

10. The punch or die component of claim 8, further comprising a release mechanism comprising a lever coupled to the tool body and configured for selective disengagement of the coupling end of the tool body from the holder, wherein the lever is configured to engage between the tool body and the holder to urge at least a portion of the coupling end of the tool body from the holder to define an air gap therebetween.

11. A press brake apparatus, comprising:
a tool body having a working end configured for operation on a workpiece and a coupling end configured for selective engagement with a holder, the working end spaced from the coupling end along the tool body, wherein the working end of the tool body defines a punch or die surface adapted for forming the workpiece by operation of the press brake apparatus; and
an adjacent tool body having an adjacent working end; and
one or more magnetic elements disposed along a lateral side of the tool body with a pole oriented toward the lateral side to induce a magnetic coupling with the adjacent tool body secured along the lateral side, and with the respective working ends adapted for cooperatively forming the workpiece upon operation of the press brake apparatus.

12. The apparatus of claim 11, wherein the magnetic coupling is adapted to maintain the adjacent tool body upright in the holder upon operation of the press brake apparatus, absent engagement of the adjacent tool body with a set screw.

13. The apparatus of claim 11, wherein the one or more magnetic elements disposed along the lateral side of the tool body comprise one or more magnets, and further comprising one or more additional magnets disposed along a lateral side of the adjacent tool body, wherein the magnets disposed along the lateral side of the tool body and the additional magnets disposed along the lateral side of the adjacent too body are adapted for inducing the magnetic coupling of the tool body with the adjacent tool body along the respective lateral sides.

14. The apparatus of claim 13, wherein the magnets disposed along the lateral side of the tool body are offset from the additional magnets disposed along the lateral side of the adjacent tool body, the offset selected for non-overlapping engagement of the respective magnets disposed along the respective lateral sides of the tool body and the adjacent tool body.

15. The apparatus of claim 11, further comprising one or more magnets disposed in the coupling end of the tool body to induce an additional magnetic coupling between the coupling end of the tool body and the holder, and further comprising a release mechanism comprising a lever coupled to the tool body and engaged between the tool body and the holder, the lever being configured to selectively urge the coupling end of the tool body from the holder to define an air gap therebetween.

16. A method comprising:
disposing at least first and second tool bodies in an adjacent relationship along respective lateral sides thereof, each of the tool bodies extending from a working end configured for operation on a workpiece to a coupling end configured for selective engagement with a holder of a press apparatus; and
magnetically engaging the first and second tool bodies, wherein a magnetic coupling is defined along the respective lateral sides by one or more magnetic elements disposed in one or both of the lateral sides with a pole oriented toward the respective lateral side in which each of the one or more magnetic elements is disposed, securing the first and second tool bodies along the lateral sides;
wherein the first and second tool bodies are configured for forming the workpiece by cooperative engagement with punch or die surfaces defined at the respective working ends.

17. The method of claim 16, further comprising engaging the first and second tool bodies with the holder at the respective coupling ends.

18. The method of claim 17, wherein the first and second tool bodies are engaged with the holder together as a unit, the first and second tool bodies being secured together in the adjacent relationship via the magnetic coupling defined along the respective lateral sides.

19. The method of claim 17, further comprising securing the coupling end of the first tool body to the holder with a set screw and operating the press apparatus to form the workpiece, absent securing the coupling end of the second tool body with such a set screw.

20. The method of claim 16, further comprising:
magnetically engaging at least one of the first and second tool bodies with the holder, wherein a magnetic coupling is defined between the holder and the respective tool body by one or more magnetic elements disposed in the tool body or tool holder; and manipulating a release engaged with the respective tool body and decoupling the respective body from the holder thereby;

wherein manipulating the release comprises manipulating a lever or rocker member adapted for urging the coupling end of the respective tool body from the holder and defining an air gap in a magnetic flux path therebetween.

* * * * *